United States Patent
Ryu et al.

(10) Patent No.: US 7,693,333 B2
(45) Date of Patent: Apr. 6, 2010

(54) PORTABLE TERMINAL AND USER INTERFACE CONTROL METHOD THEREOF BASED ON PATTERN RECOGNITION AND ANALYSIS OF IMAGE CAPTURED BY CAMERA

(75) Inventors: Dong Seok Ryu, Seoul (KR); Nho Kyung Hong, Seoul (KR); Jae Joon Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/779,538

(22) Filed: Jul. 18, 2007

(65) Prior Publication Data

US 2008/0034302 A1 Feb. 7, 2008

(30) Foreign Application Priority Data

Aug. 7, 2006 (KR) ...................... 10-2006-0074044

(51) Int. Cl.
*G06K 9/00* (2006.01)
*G06K 9/22* (2006.01)

(52) U.S. Cl. .................... 382/181; 382/107; 382/313
(58) Field of Classification Search ................. 382/107, 382/181, 298, 299, 305, 313, 154, 218; 345/156; 715/763, 863–864

See application file for complete search history.

(56) References Cited

U.S. PATENT DOCUMENTS

| | | | |
|---|---|---|---|
| 7,365,737 B2 * | 4/2008 | Marvit et al. ................ | 345/156 |
| 7,435,177 B1 * | 10/2008 | Ford ............................ | 463/30 |
| 2005/0166163 A1 * | 7/2005 | Chang et al. ................ | 715/863 |
| 2005/0216867 A1 | 9/2005 | Marvit et al. | |
| 2006/0001647 A1 * | 1/2006 | Carroll ........................ | 345/156 |
| 2006/0061551 A1 * | 3/2006 | Fateh .......................... | 345/158 |
| 2007/0188448 A1 * | 8/2007 | Hawkins et al. ............. | 345/156 |
| 2007/0283296 A1 * | 12/2007 | Nilsson ....................... | 715/863 |

FOREIGN PATENT DOCUMENTS

| | | |
|---|---|---|
| DE | 103 13 019 A1 | 10/2004 |
| EP | 1 507 196 A2 | 2/2005 |
| FR | 2 859 800 A1 | 3/2005 |
| JP | 2003-069869 A | 3/2003 |
| KR | 10-2005-0068663 A | 7/2005 |
| KR | 10-2005-0095152 A | 9/2005 |
| KR | 10-2006-0022475 A | 3/2006 |
| KR | 10-2006-0133428 A | 12/2006 |
| WO | 00/75914 A1 | 12/2000 |
| WO | 2004/066615 A1 | 8/2004 |
| WO | 2005/122415 A1 | 12/2005 |

* cited by examiner

*Primary Examiner*—Daniel G Mariam
(74) *Attorney, Agent, or Firm*—Jefferson IP Law, LLP

(57) ABSTRACT

A portable terminal and a user interface control method thereof are provided. In the terminal and method, patterns of a subject image captured by a camera are recognized and analyzed. First and second images changed according to motion (movement, holding away from or drawing close to a user) of the portable terminal are captured by the camera module. Patterns of the first and second images are recognized. The motion of the portable terminal is analyzed based on the recognized patterns. Control commands corresponding to the analyzed motion are selected. A function corresponding to the selected control command is performed. The portable terminal can be intuitively and simply used as its motion is directly applied to user interface control. User interface can be controlled without an additional part, using a camera installed to the portable terminal. Also, the present invention can resolve the problems caused when the conventional navigation key is operated.

25 Claims, 16 Drawing Sheets

PORTABLE TERMINAL AND USER INTERFACE CONTROL METHOD THEREOF BASED ON PATTERN RECOGNITION AND ANALYSIS OF IMAGE CAPTURED BY CAMERA

PRIORITY

This application claims the benefit under 35 U.S.C. §119 (a) of a Korean patent application filed in the Korean Intellectual Property Office on Aug. 7, 2006 and assigned Ser. No. 2006-0074044, the entire disclosure of which is hereby incorporated by reference.

BACKGROUND OF THE INVENTION

1. Field of the Invention

The present invention relates to user interface control technology of a portable terminal. More particularly, the present invention relates to a method for controlling a user interface of a portable terminal based on pattern recognition and analysis of a subject image captured by a camera, and to a portable terminal adapting the method.

2. Description of the Related Art

As communication technology and semiconductor technology have developed, portable terminals are being provided with communication functions, functions to provide information, game functions, etc., and are being used all over the world. Such portable terminals include portable telephones, personal digital assistants (PDAs), MP3 players, portable multimedia players (PMPs), digital multimedia broadcasting (DMB) receivers, etc.

Portable terminals have been developed to have various functions in addition to their communication functions. For example, portable terminals are now employing a camera function to take a photograph. However, the conventional portable terminals have only captured still images or moving images using a camera installed thereto.

The conventional portable terminal includes a navigation key, having four direction keys, which allows a user to search for a menu or file or to focus their cameras. Also, the navigation key may be used to scroll through an image or text when the image or text includes more information than can be shown on one screen. However, the conventional navigation key has disadvantages in that, since it allows movement in only the four directions of up/down/right/left, it is difficult to control a screen for movement in a certain direction.

SUMMARY OF THE INVENTION

An aspect of the present invention is to address at least the above-mentioned problems and/or disadvantages and to provide at least the advantages described below. Accordingly, an aspect of the present invention is to provide a method and apparatus for enhancing the use of a camera installed in a portable terminal.

Another aspect of the present invention is to provide an apparatus and method for overcoming the restriction and inconvenience in the operation of a navigation key of a portable terminal.

A further aspect of the present invention is to provide an apparatus and method for controlling a user interface of a portable terminal, more intuitively and conveniently.

In accordance with as aspect of the present invention, a portable terminal and method for controlling a user interface of a portable terminal based on pattern recognition and analysis of a subject image captured by a camera are provided.

In accordance with another aspect of the present invention, a method for controlling a user interface of a portable terminal including a camera module is provided. The method includes capturing first and second images through the camera module, recognizing patterns of the first and second images, respectively, analyzing the recognized patterns, selecting control commands based on the analysis result and performing functions corresponding to the control commands.

In accordance with another aspect of the present invention, a method for controlling a user interface of a portable terminal including a camera module is provided. The method includes capturing first and second images changed according to a motion of the portable terminal, through the camera module, recognizing patterns of the first and second images, respectively, analyzing the motion of the portable terminal based on the recognized patterns, selecting control commands corresponding to the motions of the portable terminal, based on the analysis result and performing functions corresponding to the control commands.

In accordance with another aspect of the present invention, a portable terminal is provided. The portable terminal includes a camera module for capturing first and second images, a pattern recognition unit for recognizing patterns of the first and second images, respectively, a pattern analysis unit for analyzing the recognized patterns, based on the pattern recognition result of the pattern recognition unit and for selecting control commands based on the analysis result, and a controller for performing functions corresponding to the control commands.

BRIEF DESCRIPTION OF THE DRAWINGS

The above and other aspects, features and advantages of certain exemplary embodiments of the present invention will be more apparent from the following detailed description in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness Pattern Recognition and Analysis of Image Captured by Camera User interface control technology of a portable terminal according to an exemplary embodiment of the present invention is based on pattern recognition and analysis of an image captured by a camera. Therefore, an exemplary portable terminal includes a camera (more precisely a camera module having an image sensor and a signal processing unit, etc.) for capturing images. An image that the camera is capturing is inevitably slightly changed according to movement of the camera. In the present description, pattern recognition refers to recognizing a change of an image that the camera is shooting, and pattern analysis refers to detecting movement of the portable terminal from the recognized image change.

Figure 1A:
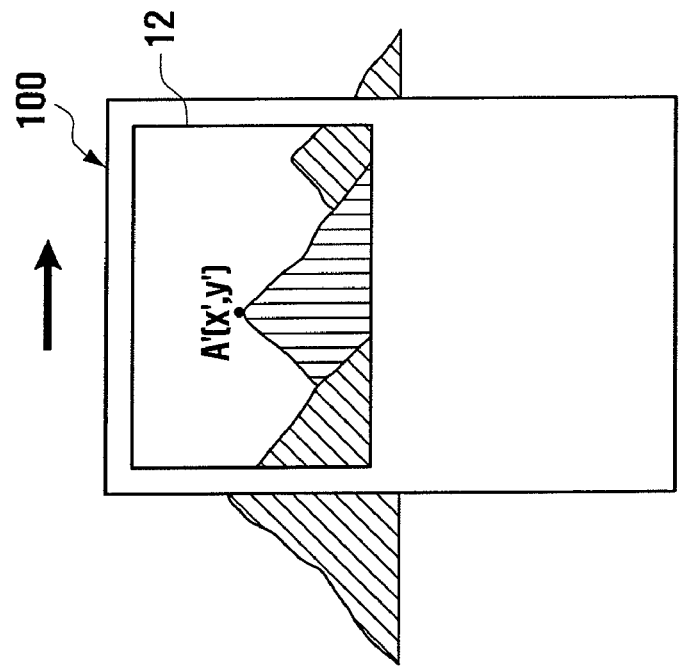
FIGS. 1A and 1B are views illustrating the concept of pattern recognition of an image captured by a camera, according to an exemplary embodiment of the present invention.
Figure 1A:
Figure 1A:
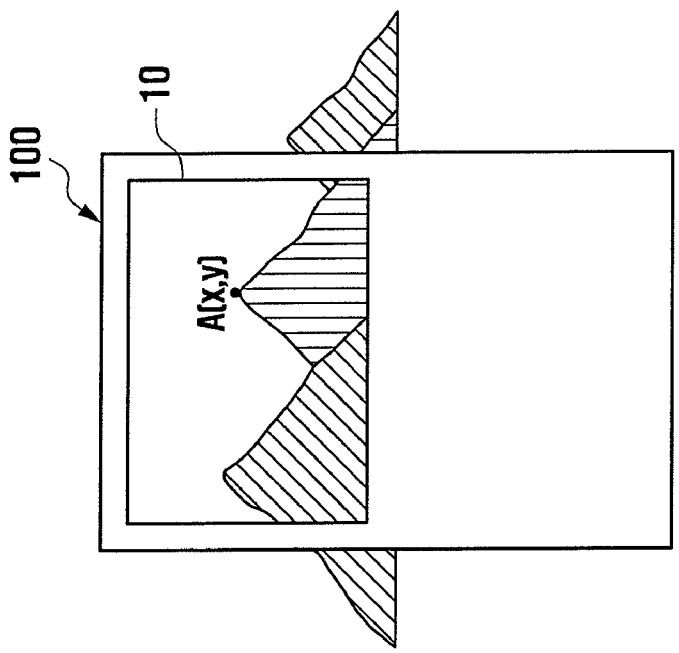
Figure 1B:
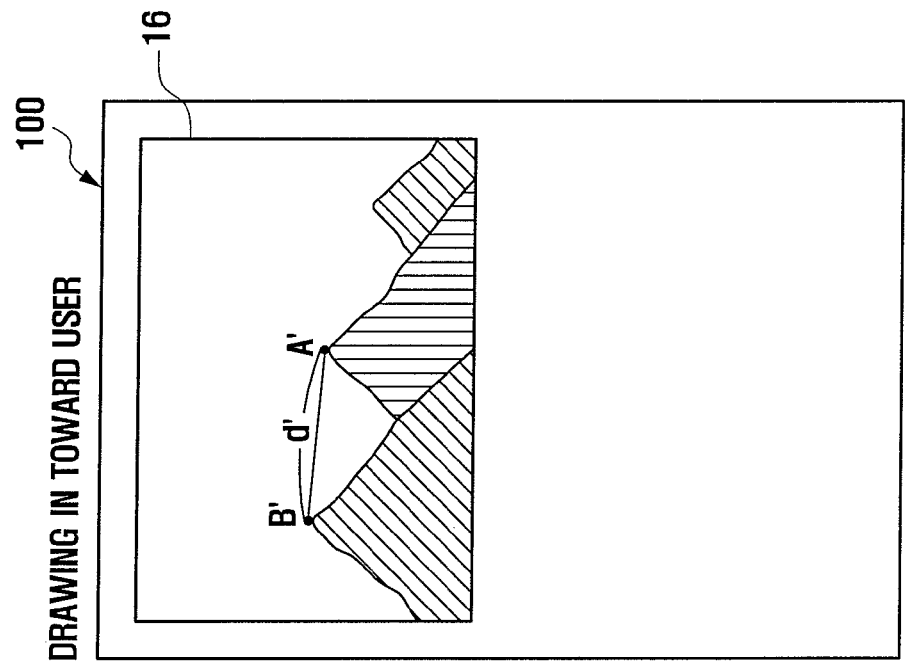
Figure 1B:
Figure 1B:
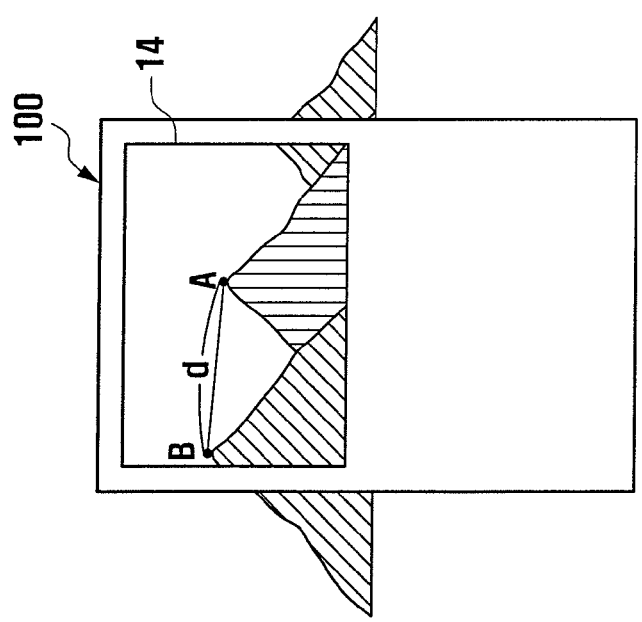

Pattern recognition of an image captured by a camera may be classified into two types. One type is to recognize position change and another type is to recognize distance change. FIGS. 1A and 1B are views illustrating the concept of pattern recognition of an image captured by a camera, according to an exemplary embodiment of the present invention. Specifically, FIG. 1A is a view illustrating recognition of a position change and FIG. 1B is a view illustrating recognition of a distance change.

The following is a description of recognition of position change. In an exemplary embodiment as illustrated in FIG. 1A, an image 10 is captured through a camera (not shown) of a portable terminal 100. Then, another image 12 is captured by the portable terminal 100 after the portable terminal has moved relative to the position where the image 10 is captured. Here, when comparing between the positions (x, y) and (x', y') of the points A and A' which are the same object in the two images 10 an 12 (hereinafter, image 10 is a first image and image 12 is a second image), respectively, the point A' of the second image 12 is located to the left relative to the point A of the first image 10. Therefore, it can be determined that the portable terminal 100 was moved to the right. As such, from the position change of a corresponding point in the two images 10 and 12, it can be estimated which direction the portable terminal 100 is moved.

The following is a description of recognition of distance change. In an exemplary embodiment as illustrated in FIG. 1B, an image 14 is captured through a camera of a portable terminal 100. Then another image 16 is captured after the portable terminal 100 is drawn closer to the user. Here, when a distance d between two points A and B of the image 14 is compared with a distance d' between points A' and B' of the image 16, the distance d' of the second image 16 is smaller than the distance d of the first image 14. Therefore, it can be concluded that the portable terminal 100 was moved from the position in which image 14 was captured. As such, from the distance change between distances d and d' corresponding to points in the two images 14 and 16, it can be estimated whether the portable terminal is drawn closer to or moved away from the user.

As such, exemplary embodiments of the present invention can determine whether the portable terminal is moved based on pattern recognition of an image captured by a camera and pattern analysis thereof, and allows a user to more easily control a user interface of the portable terminal. In the following, push and pull of a portable terminal means that the portable terminal is moved (drawn closer to or moved away from a user) in the direction perpendicular to the screen of the display thereof. And, movement of a portable terminal means that the portable terminal is moved in directions other than the push and pull directions.

Portable Terminal

Figure 2:
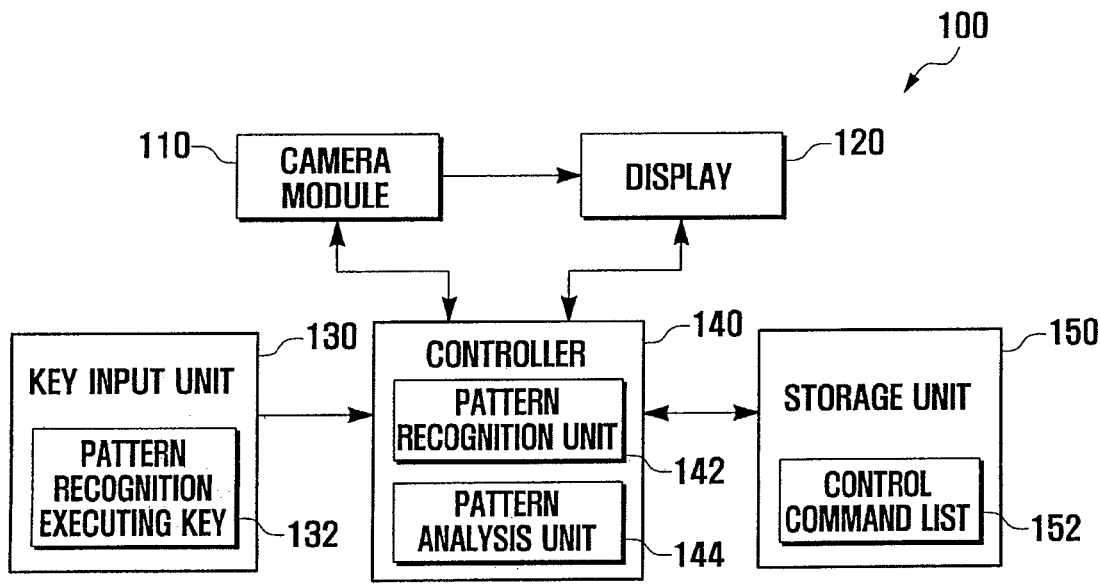
FIG. 2 is a schematic block diagram illustrating a portable terminal according to an exemplary embodiment of the present invention.

FIG. 2 is a schematic block diagram illustrating a portable terminal according to an exemplary embodiment of the present invention.

Referring to FIG. 2, the portable terminal 100 includes a camera module 110, display 120, key input unit 130, controller 140, and storage unit 150.

The camera module 110 captures images of a subject in real time. That is, the camera module 110 captures a first image and a second image in order. As is well known, the camera module 110 may include an image sensor, signal processing unit, image processing unit, etc. The image sensor converts a subject image into an electrical signal. The signal processing unit converts an analog signal into a digital signal. The image processing unit processes the digital signal to display image data on the display 120 or to store it in the storage unit 150.

The display 120 displays various applications executed in the portable terminal 100 and data created as the applications are executed. In general, when the camera module 110 is operated, image data is displayed in real time on the display 120. However, image data is not displayed on the display 120 during execution of an exemplary control method of the present invention.

The key input unit 130 inputs user's operation signals to control operations of the portable terminal 100. In particular, the key input unit 130 includes a pattern recognition executing key 132 that allows a user to select whether a pattern recognition function is executed. The pattern recognition executing key 132 may be implemented by an additional key or by allowing the pattern recognition function to be executed by one of the given keys. Alternatively, the pattern recognition function may be executed by other than a user's selection, such that a pattern recognition executing key 132 may be omitted.

The controller 140 controls the operation of respective elements of the portable terminal 100. In particular, the controller 140 includes a pattern recognition unit 142 and a pattern analysis unit 144. An exemplary pattern recognition unit 142 receives image data captured through the camera module 110 to perform pattern recognition. The pattern analysis unit 144 analyzes a pattern based on the pattern recognition results from the pattern recognition unit 142. The pattern analysis unit 144 also determines movement of the portable terminal from the analysis to select a control command corresponding to the determined movement. The controller 140 performs a function corresponding to the control command selected in the pattern analysis unit 144.

In an exemplary embodiment, the pattern recognition unit 142 can determine a position change of two images. From the position change, the pattern analysis unit 144 calculates movement direction of the image to determine that the portable terminal 100 is moved in a direction opposite from the calculated movement direction of the image. In response thereto, the pattern analysis unit 144 selects a control command for moving the focus of a screen of the display 120 similar to the movement of the portable terminal 100. In another exemplary embodiment, the pattern recognition unit 142 can recognize a distance change of two images. For the distance change, the pattern analysis unit 144 determines a distance increment/decrement to determine whether the portable terminal 100 is moved away from or drawn closer to a user, and, in response thereto, selects a control command to magnify or reduce a screen of the display 120.

The storage unit 150 stores various programs and applications, which are executed in the portable terminal 100, and data related thereto. In an exemplary embodiment, the storage unit 150 includes a control command list 152. The control command list 152 includes various control commands mapped to movements of the portable terminal, which were determined based on pattern recognition and pattern analysis. In an exemplary embodiment, similar movements of the portable terminal can be mapped to different control commands according to specific applications. The storage unit 150 may also temporarily store image data captured by the camera module 110.

The following is a detailed description of an exemplary control method of a portable terminal.

User Interface Control Method of a Portable Terminal

Figure 3:
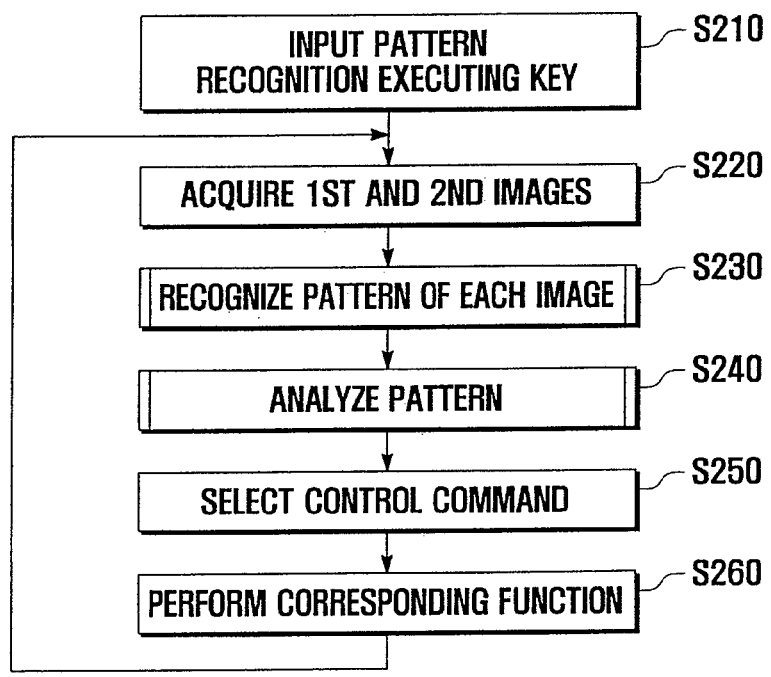
FIG. 3 is a flow chart illustrating a user interface control method according to an exemplary embodiment of the present invention.

FIG. 3 is a flow chart illustrating a user interface control method according to an exemplary embodiment of the present invention.

Referring to FIGS. 2 and 3, a pattern recognition executing key 132 is keyed in step S210. That is, a user keys the pattern recognition executing key 132 so the portable terminal 100 can execute the pattern recognition function. However, step S210 is not always necessary in the control method of the portable terminal. That is, an exemplary control method according to the present invention may be implemented without step S210. Furthermore, before executing step S210, other steps may be further performed, which will be described in other exemplary embodiments of the present invention, below.

The camera module 110 acquires a first image and a second image under control of the controller 140 and transmits them to the pattern recognition unit 142 in step S220. The first and second images refer to adjacent frame images in a time domain. FIGS. 1A and 1B illustrate examples of first and second images, in which 10 and 14 refer to the first image and 12 and 16 refer to the second image.

Figure 4:
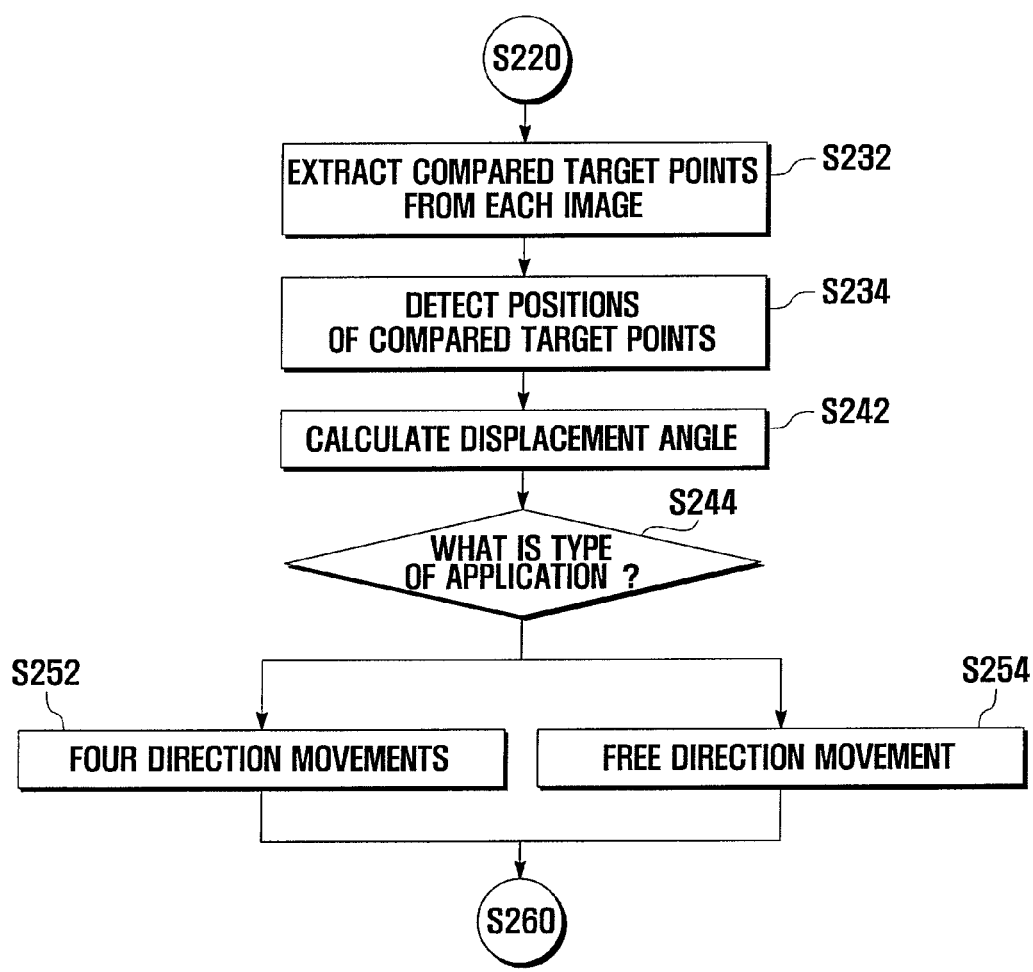
FIG. 4 is a flow chart illustrating a user interface control method according to an exemplary embodiment of the present invention.

The pattern recognition unit 142 recognizes patterns of the first and second images, respectively in step S230. That is, the pattern recognition unit 142 extracts similar patterns, intended to be compared, from the first and second images and then determines information from the extracted patterns. For example, as illustrated in FIG. 4, the pattern recognition unit 142 extracts compared target points from the respective images and determines positions of the extracted points, which will be further described below.

The pattern analysis unit 144 analyzes recognized patterns in step S240. That is, the pattern analysis unit 144 compares pattern information of the first and second images, determined by the pattern recognition unit 142, to calculate pattern change, and performs a determination process based on the pattern change. For example, as illustrated in FIG. 4, the pattern analysis unit 144 calculates a displacement angle to determine types of application, which will be further described below.

In step S250, the pattern analysis unit 144 selects a corresponding control command from the control command list 152 according to the analysis result. For example, as illustrated in FIG. 4, the pattern analysis unit 144 selects control commands related to movements of four directions or control commands related to movements of free direction, according to the types of application, which will be further described below.

The controller 140 performs a function corresponding to the control commands in step S260. For example, as illustrated in FIG. 4, when a control command related to the movements of four directions is selected, the controller 140 operates according to the selected control command.

FIG. 4 is a flow chart illustrating a user interface control method according to an exemplary embodiment of the present invention.

Referring to FIG. 4, the camera module captures first and second images and transmits them to the pattern recognition unit in step S220.

The pattern recognition unit extracts compared target points from the first and second images, respectively in step S232. The compared target points may be points, for example, a vertex of a specific pattern, a cross point, etc., which can be easily differentiated from other points. For ease of describing an exemplary embodiment, the two images illustrated in FIG. 1A are hereinafter referred to as a first image 10 and a second image 12, respectively, and A and A' are referred to as compared target points.

When determining the compared target points, the pattern recognition unit determines positions of the compared target points in step S234. As illustrated in FIG. 1A, the point A has a position (x, y), and point A' has a position (x', y'). The relation between the two positions (x, y) and (x', y') can be expressed as following Equation 1.

$$X'=x+a, \text{ and } Y'=y+b.$$ [Equation 1]

Figure 5:
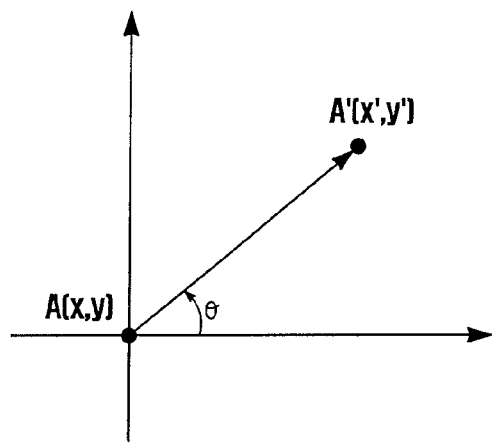
FIG. 5 is a view illustrating positions of compared target points and a displacement angle in the exemplary control method of FIG. 4.

When detecting positions of the compared target points, the pattern analysis unit determines a displacement angle θ in step S242. FIG. 5 illustrates positions A(x, y) and A'(x', y') of compared target points and a displacement angle θ. The displacement angle is indicative of a direction of position change and can be determined from the position of the compared target points using Equation 2.

$$\theta=\tan^{-1}(b/a)$$ [Equation 2]

For example, if θ=30°, it indicates that a camera image is moved by 30°, or that the portable terminal is moved by 210° in the direction opposite the movement direction of the camera image.

The pattern analysis unit determines a type of an application which is currently executed in step S244. Determining the type of application occurs because, although there are similar movements by portable terminals, they can be mapped to different control commands according to applied applications. There is a variety of applications to which a control method of the present invention can be applied, for example, menu lists 300 illustrated in FIGS. 6A to 6C, file lists 400 illustrated in FIGS. 7A and 7B, and image files 500 illustrated in FIGS. 8A and 8B, etc. The present invention can be applied to other applications, such as message write/check windows, document files, music files, and games, etc. since the control method of the present invention can be applied to a variety of applications, it is necessary to determine the type of applications prior to selecting a control command.

According to the determination of displacement angle and the type of application, the pattern analysis unit selects a control command corresponding thereto in step S252 or S254. Table 1 describes a control command list according to an exemplary embodiment of the present invention.

TABLE 1

| Application | Displacement angle θ | Control command |
|---|---|---|
| Menu list | −45° < θ < 45° | Display previous list |
|  | 45° < θ < 135° | Move focus to down menu |
|  | 135° < θ < 225° | Display next list |
|  | 225° < θ < 315° | Move focus to up menu |
| File list | −45° < θ < 45° | Move focus to previous file |
|  | 45° < θ < 135° | Move focus to down file |
|  | 135° < θ < 225° | Move focus to next file |
|  | 225° < θ < 315° | Move focus to up file |
| Image file |  | Move focus according to corresponding displacement angle |

As described in Table 1, when the type of application is a menu list or a file list, the pattern analysis unit selects a control command related to movements of four directions according to the displacement angle in step S252. When the type of application is an image file, the pattern analysis unit selects a control command related to movement of free direction according to the displacement angle, without direction restriction in step S254.

The controller performs functions corresponding to the selected control commands in step S260. Examples in which the procedure is executed are illustrated through the screens in FIGS. 6A to 6C, FIGS. 7A and 7B, and FIGS. 8A and 8B.

Figure 6A:
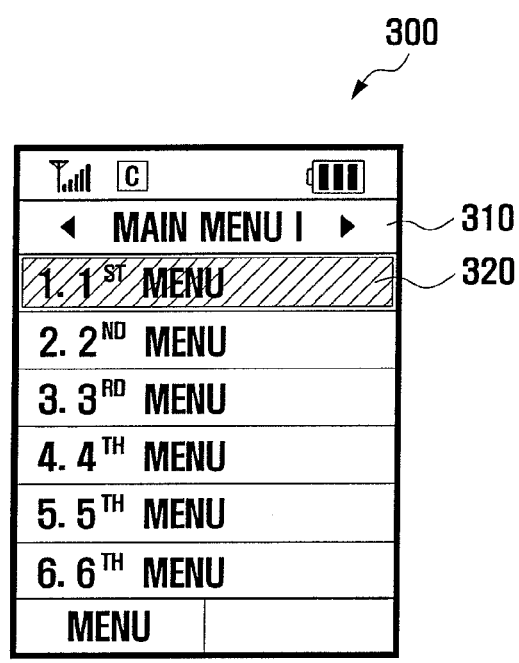
FIGS. 6A to 6C are screens illustrating the exemplary control method of FIG. 4.
Figure 6B:
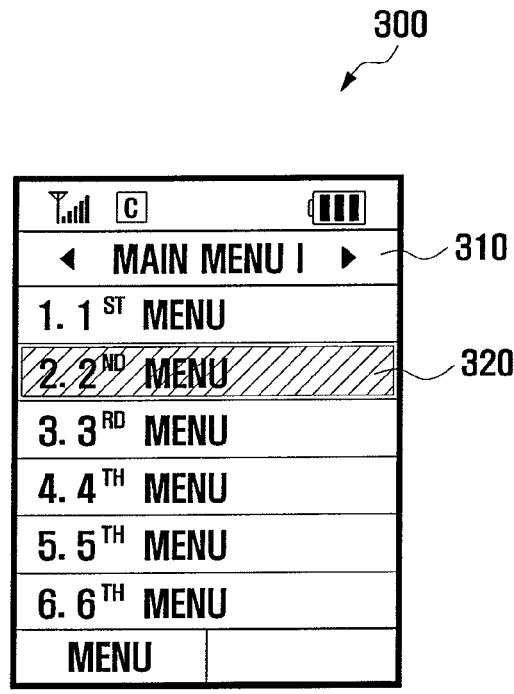

When an application is a menu list and a displacement angle is in a condition of 45°<θ<135°, as described in Table 1, the control command is "Move focus to down menu." That is, as illustrated in FIG. 6A in a state while the focus 320 is placed at the first menu of the main menu I 310, the portable terminal is moved down so that the displacement angle is in the condition of 45°<θ<135°. Accordingly, the controller moves the focus 320 to the down direction, as illustrated in FIG. 6B.

Figure 6C:
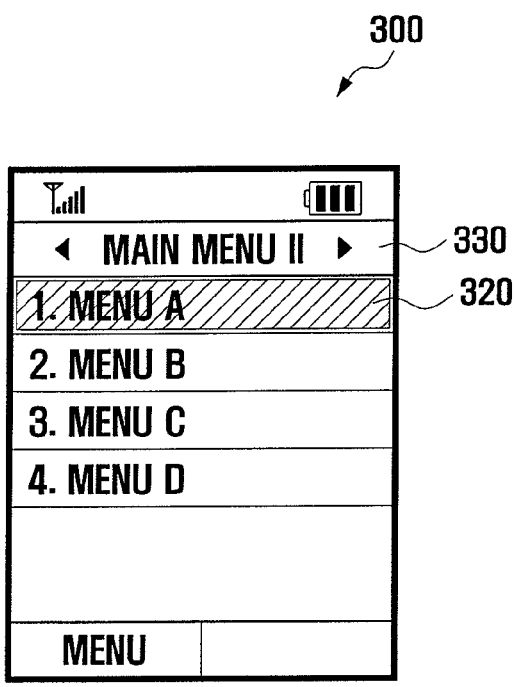
Figure 7A:
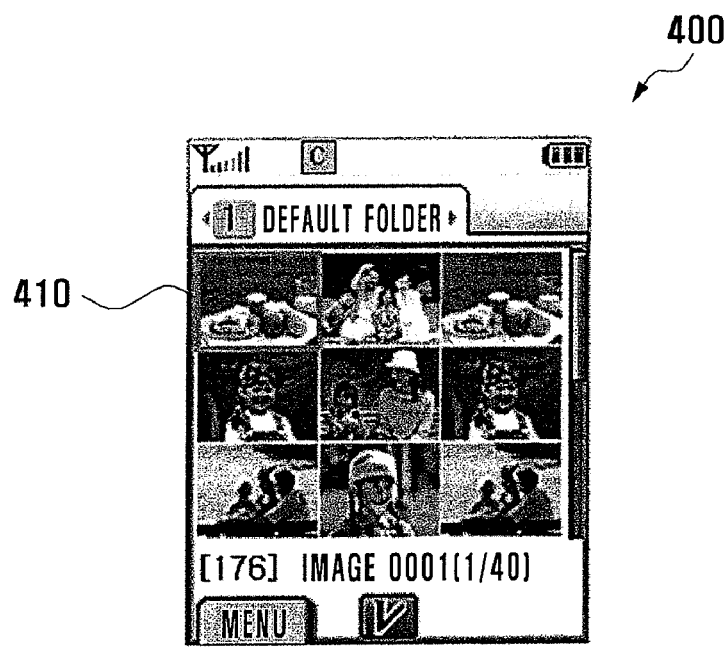
FIGS. 7A and 7B are additional screens illustrating the exemplary control method of FIG. 4.
Figure 7B:
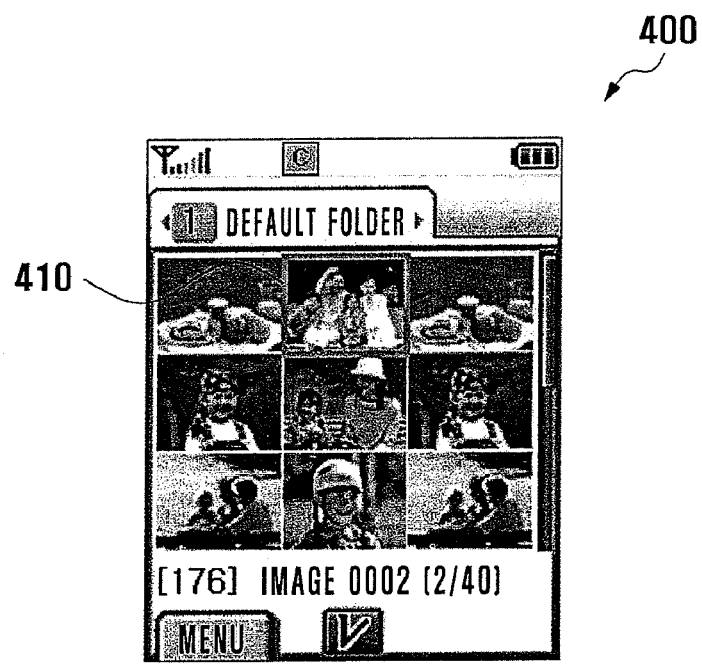

When an application is a menu list and a displacement angle is in a condition of 135°<θ<225°, as described in Table 1 the control command is "Display next list." That is, as illustrated in FIG. 6A in a state while the focus 320 is placed at the first menu of the main menu I 310, the portable terminal is moved right so that the displacement angle is in the condition of 135°<θ<225°. Accordingly, the controller displays the next main menu II 330 and its submenu, as illustrated in FIG. 6C When an application is a file list and a displacement angle is in a condition of 135°<θ<225°, as described in Table 1 the control command is "Move focus to next file." That is, as illustrated in FIG. 7A in a state while the focus 410 is placed at a file, the portable terminal is moved right so that the displacement angle is in the condition of 135°<θ<225°. Accordingly, the controller moves the focus 410 to the next file, as illustrated in FIG. 7B.

Figure 8A:
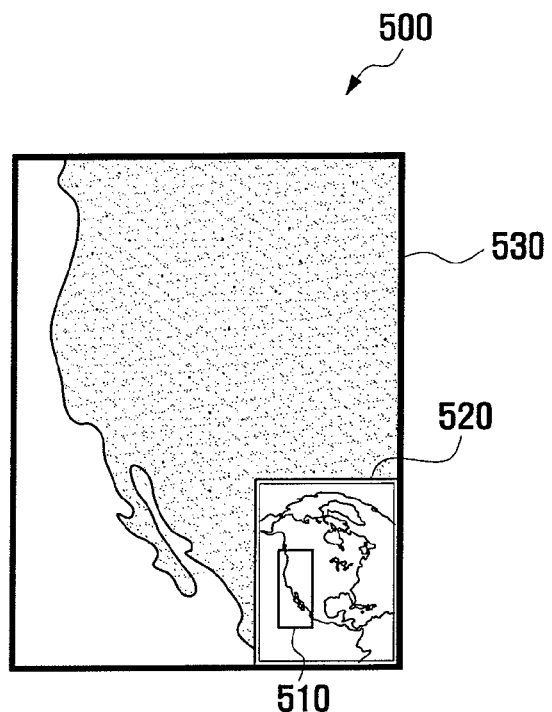
FIGS. 8A and 8B are still additional screens illustrating the exemplary control method of FIG. 4.
Figure 8B:
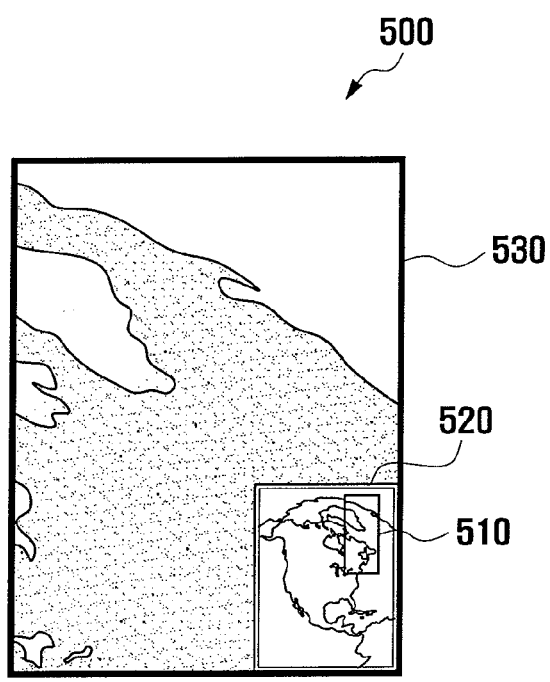

When an application is an image file as described in Table 1, the control command is "Move focus according to corresponding displacement angle." As illustrated in FIG. 8A, a focus 510 is placed at a part of display window 520 and a display screen 530 displays in detail an image in the focus 510. In such a state, when the portable terminal is moved in any direction, the displacement angle is determined as a value based on a direction opposite the movement of the portable terminal. As an example, while moving the focus 510 corresponding to the movement direction of the portable terminal as illustrated in FIG. 8B, the controller displays the image in the focus 510 on the display screen 530. Here, the focus can be freely moved in any direction similar to a movement of a mouse of a computer.

Figure 9:
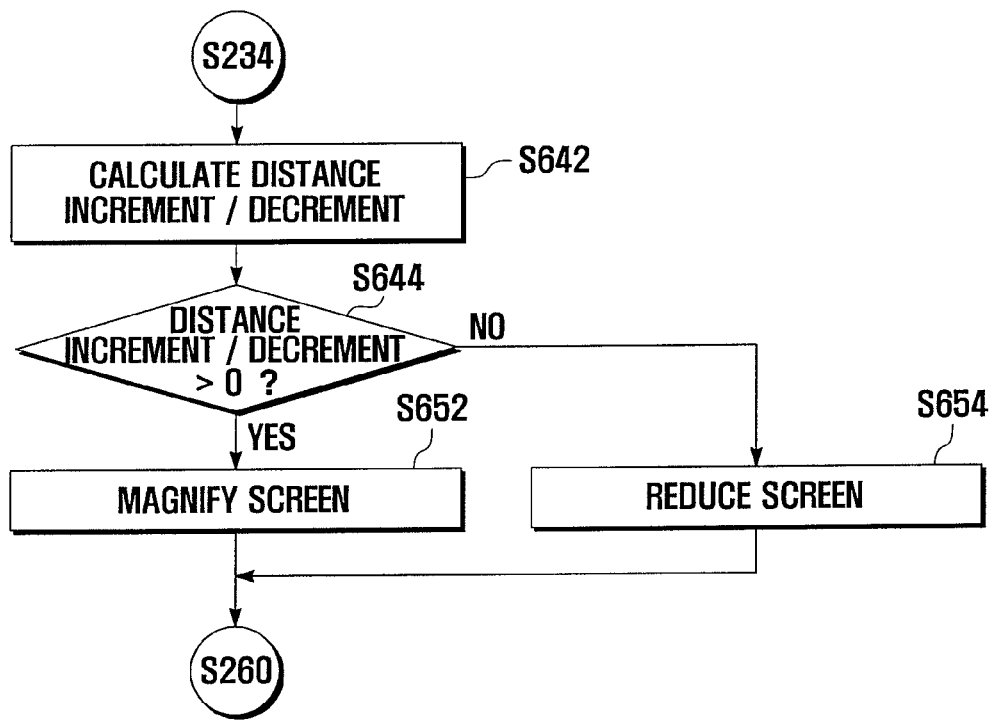
FIG. 9 is a flow chart illustrating a user interface control method according to an exemplary embodiment of the present invention.

FIG. 9 is a flow chart illustrating a user interface control method according to an exemplary embodiment of the present invention.

Referring to FIG. 9, positions of the compared target points that are extracted from the captured first and second images are detected, as illustrated in step S234 from the previous example. In the exemplary embodiment, two target points are compared. For example, the two images illustrated in FIG. 1B are referred to as the first image 14 and the second image 16, respectively. The points, A and B are the compared target points of the first image 14 and A' and B' are the compared target points of the second image 16. Also, the points A and B have positions (x, y) and (u, v), respectively. In addition, the points A' and B' has positions (x', y') and (u', v'), respectively.

Figure 10:
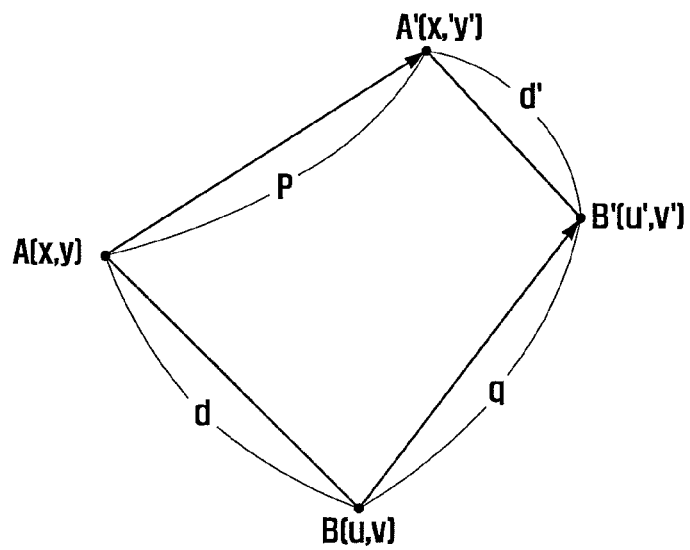
FIG. 10 is a view illustrating positions of compared target points and distance increment/decrement therebetween in the exemplary control method of FIG. 9.

When determining positions of the compared target points, the pattern analysis unit determines distance increment/decrement Δd in step S642. If d is defined as a distance between two points A and B in the first image 14, and d' is defined as a distance between two points A' and B' in the second image 16, the distance increment/decrement Δd can be expressed as following Equation 3. FIG. 10 shows positions of compared target points and distance increment/decrement therebetween.

$$d=\sqrt{(x-u)^2+(y-v)^2},\ d'=\sqrt{(x'-u')^2+(y'-v')^2},\text{ and }\Delta d=d-d'\quad\text{[Equation 3]}$$

When the distance increment/decrement is determined, the pattern analysis unit determines whether it is positive or negative in step S644. When the distance increment/decrement is greater than zero, or the distance d in the first image 14 is greater than the distance d' in the second image 16, it means that the portable terminal was drawn closer to a user. On the contrary, when the distance increment/decrement is less than zero, or the distance d in the first image 14 is less than the distance d' in the second image 16, it means that the portable terminal was moved away from the user.

The pattern analysis unit selects control commands corresponding to the determination result of the distance increment/decrement in steps S652 and S654. That is, when the distance increment/decrement is positive, the pattern analysis unit selects a control command for screen magnification in S652, and when the distance increment/decrement is negative, the pattern analysis unit selects a control command for screen reduction in S654. As previously described, the pattern analysis unit may be implemented in such a way that a type of application is determined and then a control command is selected only for a proper application.

After selecting the control command, the controller performs a function corresponding thereto in step S260, in which the procedure is illustrated through the screens in FIGS. 11A and 11B, and FIGS. 12A and 12B.

Figure 11A:
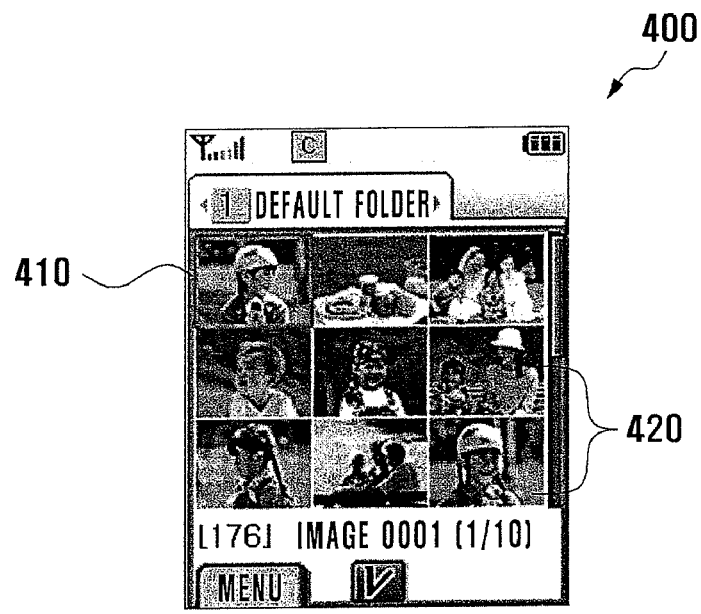
FIGS. 11A and 11B are screens illustrating the exemplary control method of FIG. 9.
Figure 11B:
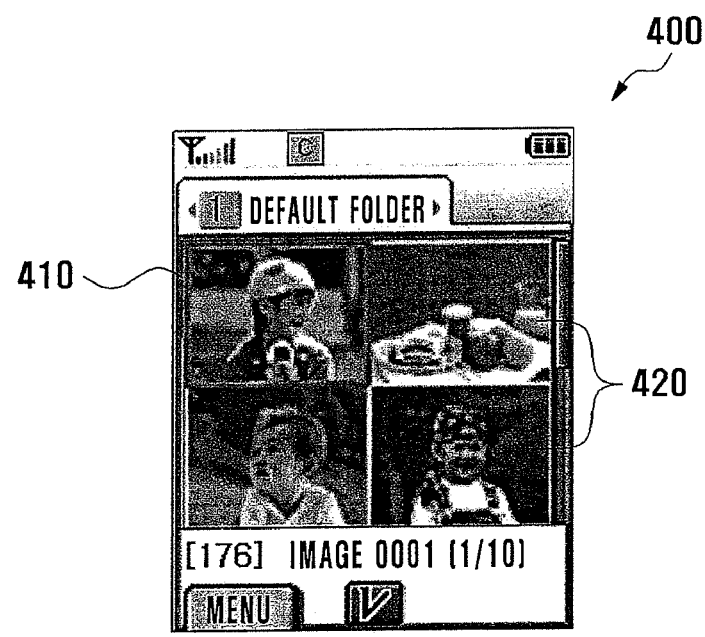

FIG. 11A illustrates a screen of a portable terminal, in which a plurality of image files 420 is listed on a file list 400 and the focus 410 is placed at a specific file. In this state, when the portable terminal is drawn closer toward a user, the distance increment/decrement is determined as a positive value and thus a control command magnifies the image on the screen. Therefore, as illustrated in FIG. 11B, the controller magnifies and displays the image on the screen, on the basis of the file at which the focus 410 is placed.

Figure 12A:
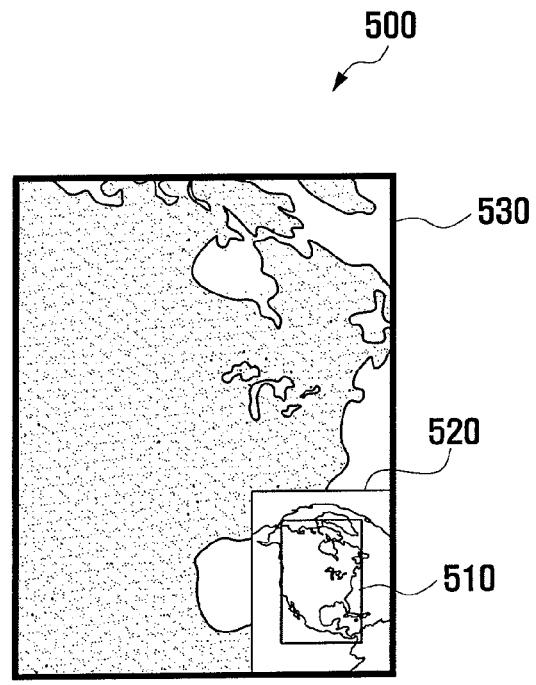
FIGS. 12A and 12B are other screens illustrating the exemplary control method of FIG. 9.
Figure 12B:
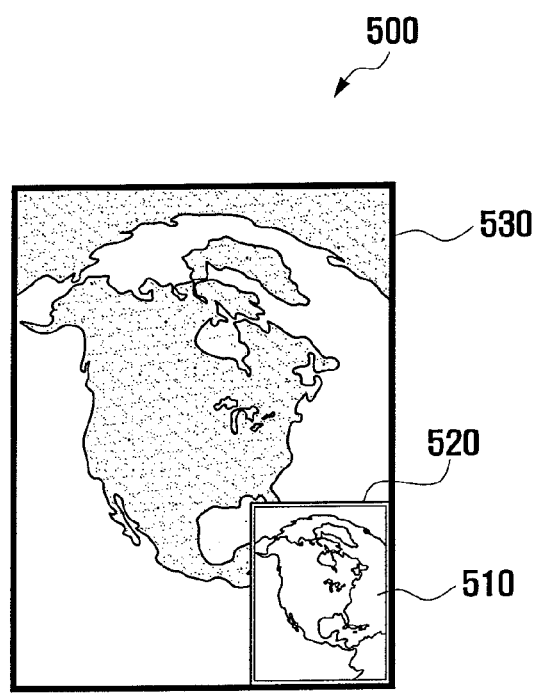

FIG. 12A illustrates a screen displaying an image file 500, in which a display window 520 at which the focus 510 is placed is displayed and the display screen 530 displays in detail the image in the focus 510. In this state, when the portable terminal is moved away from the user, the distance increment/decrement is calculated as a negative value and thus a control command reduces the image on the screen. As illustrated in FIG. 12B, with magnification of the size of the focus 510, the controller reduces the image in the focus 510 to display it on the display screen 530.

As another example, if the application is a window for a document file including letters or a message write/check (not illustrated in the drawings), a font size of the letters is increased or decreased using a screen magnification/reduction function.

Figure 13:
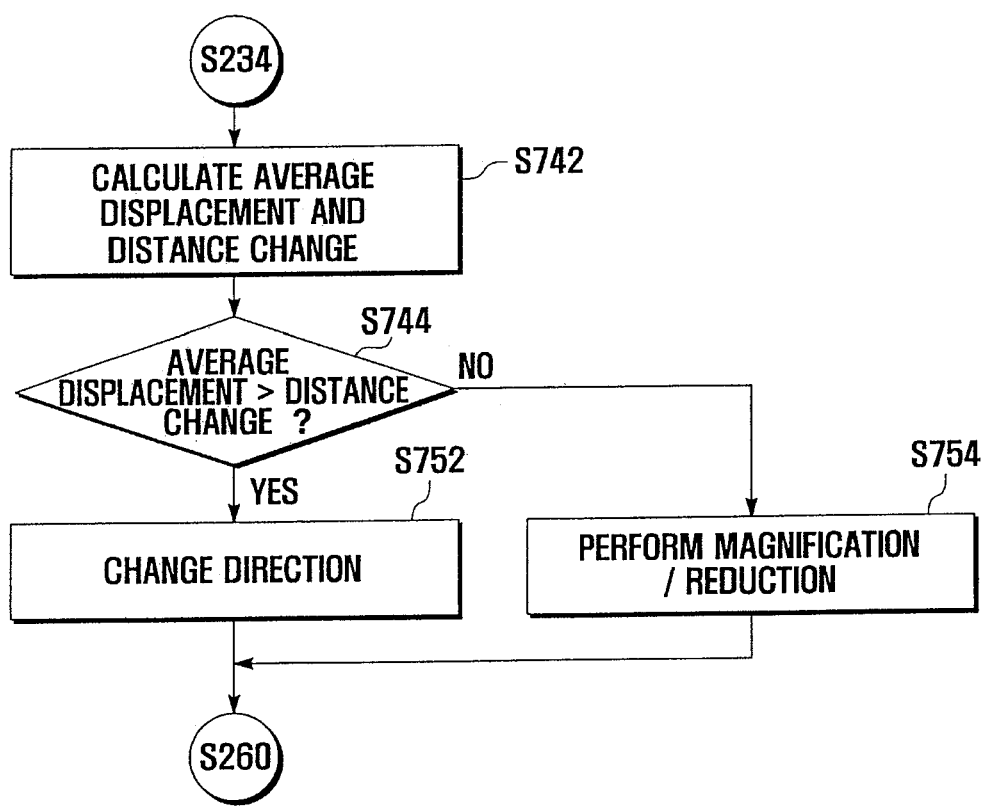
FIG. 13 is a flow chart illustrating a user interface control method according to an exemplary embodiment of the present invention.

FIG. 13 is a flow chart illustrating a user interface control method according to an exemplary embodiment of the present invention.

In an exemplary embodiment, direction movements of a focus and a screen are controlled according to movement of a portable terminal, and magnification/reduction of a focus and a screen are controlled as a portable terminal is moved away from and drawn closer to the user.

Referring to FIG. 13, positions of the compared target points that are extracted from the captured first and second images are detected, similar to step S234 as previously described. The number of the compared target points is at least two or more.

The pattern analysis unit calculates average displacement and distance change in step S742. As illustrated in FIG. 10, two points A and B are in a first image and have positions (x, y) and (u, v), respectively. Another two points A' and B' are in a second image and have positions (x', y') and (u', v'), respectively. Here, a distance p between points A and A' and a distance q between points B and B' can be expressed using equation 4.

$$p = \sqrt{(x-x')^2 + (y-y')^2},$$
$$q = \sqrt{(u-u')^2 + (v-v')^2},$$
and
$$m = \frac{p+q}{2}$$

[Equation 4]

Here, p and q are displacements, respectively. Also, m denotes an average displacement, or an average value between p and q.

The average displacement indicates movement of the second image on the basis of the first image. The distance change is defined as an absolute value of distance increment/decrement. The distance change indicates how much the second image is moved away from or drawn closer toward to a user on the basis of the first image.

When the average displacement and the distance change are determined, the pattern analysis unit compares them with each other in step S744. When the average displacement is greater than the distance change, it means that the moving distance of the portable terminal is greater than that of pushing or pulling distance. On the contrary, when the average displacement is less than the distance change, it means that the moving distance of the portable terminal is less than that of pushing or pulling distance.

The pattern analysis unit determines proper control commands corresponding to the comparison result in step S752 and S754. That is, when the average displacement is greater than the distance change, the pattern analysis unit selects a control command for direction movement in S752. When the distance change is greater than the average displacement, the pattern analysis unit selects a control command for magnification/reduction of an image in step S754.

As illustrated, an exemplary embodiment of the present invention can simultaneously perform a direction movement function and a magnification/reduction function, when the portable terminal having a camera is moved to control itself. That is, it's a portable terminal's direction movement function can be controlled as previously described with reference to FIG. 4, and its magnification/reduction function can be controlled as previously described with reference to FIG. 9. Therefore, the description of controlling such functions will be omitted for conciseness.

Figure 14A:
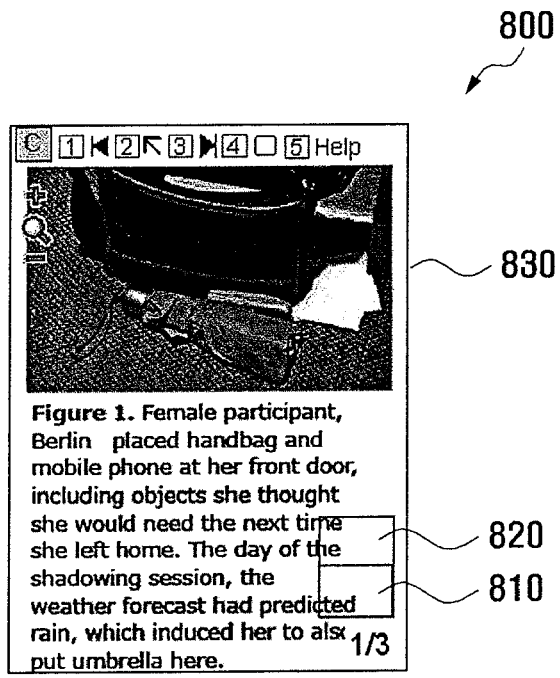
FIGS. 14A and 14B are screens illustrating the exemplary control method of FIG. 13.
Figure 14B:
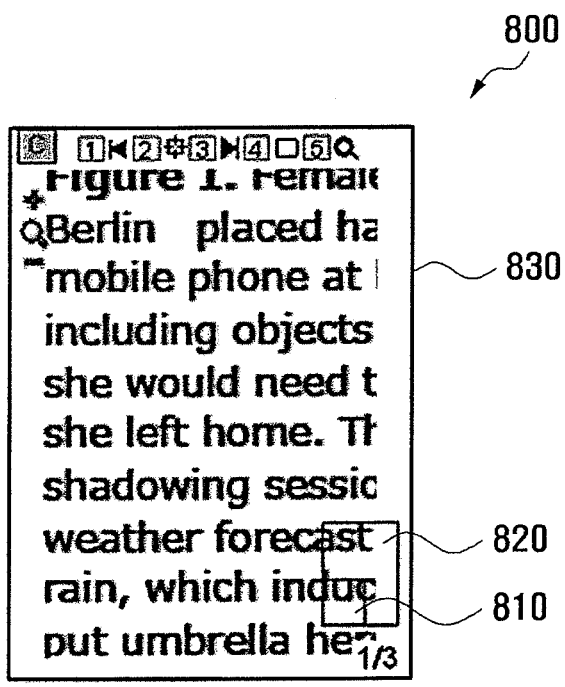

The controller performs a function corresponding to the selected control command in step S260, in which the procedure is illustrated through the screens in FIGS. 14A and 14B.

FIG. 14A illustrates a screen displaying a document file 800, in which the focus 810 is placed within a display window 820 and the display screen 830 displays document content from the focus 810. In this state, when the portable terminal is drawn closer toward a user, as illustrated in FIG. 14B, with reduction of the size of the focus 810, the controller magnifies the document content from the focus 810 and display it on the display screen 830. In this state, when the portable terminal is moved, as the focus 810 changes its position, the display screen 830 also displays changing document content thereof.

Figure 15:
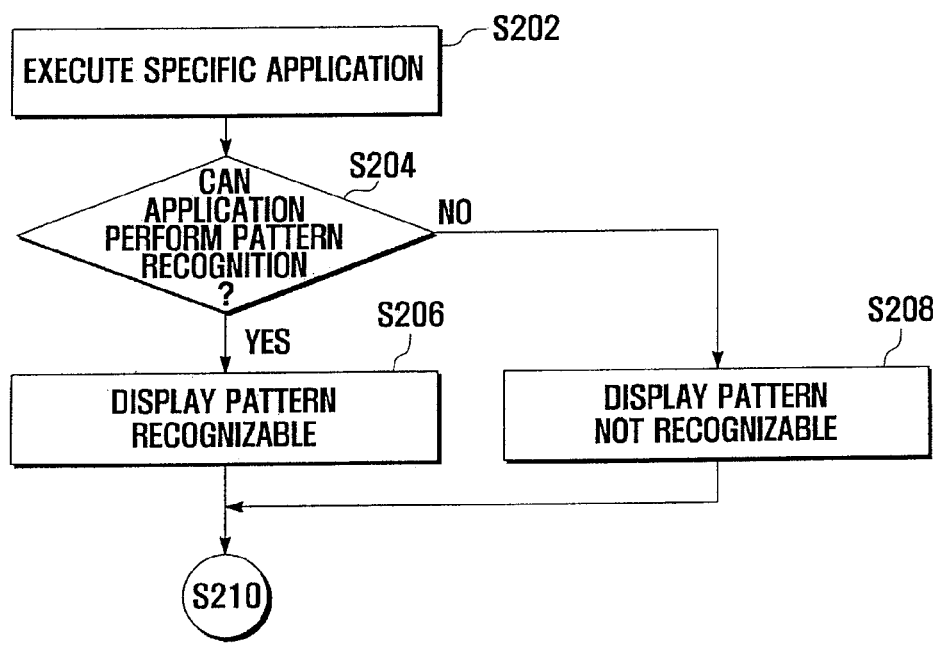
FIG. 15 is a flow chart illustrating a user interface control method according to an exemplary embodiment of the present invention.

FIG. 15 is a flow chart illustrating a user interface control method according to an exemplary embodiment of the present invention.

In an exemplary embodiment, a user is notified of whether the current state of a portable terminal can be controlled by pattern recognition.

Referring to FIG. 15, an exemplary embodiment executes a specific application in step S202, before the pattern recognition executing key is inputted to capture images in step S210, as previously described with reference to FIG. 3.

In a state where the specific application is being executed under the control of the controller, the controller determines whether the currently executed application can perform pattern recognition in step S204. When the application can perform pattern recognition, the controller displays "pattern recognizable" on the display screen using icons, etc., in step S206. When the application cannot perform pattern recognition, the controller displays "pattern not recognizable" on the display screen in step S208.

Figure 17A:
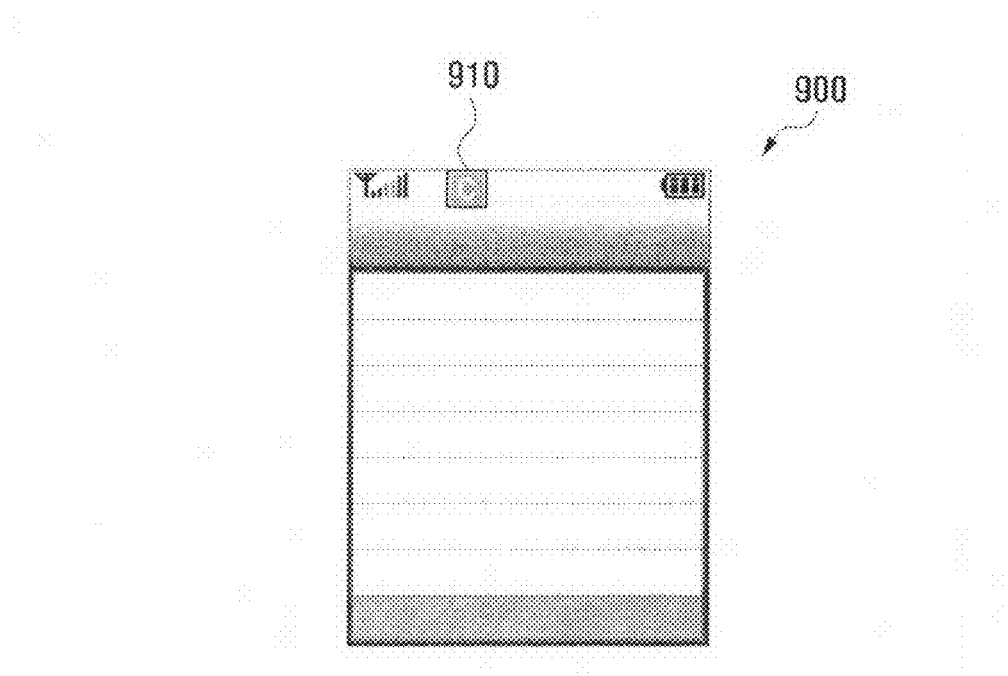
FIGS. 17A to 17C are screens illustrating the exemplary control methods of FIGS. 15 and 16.
Figure 17B:
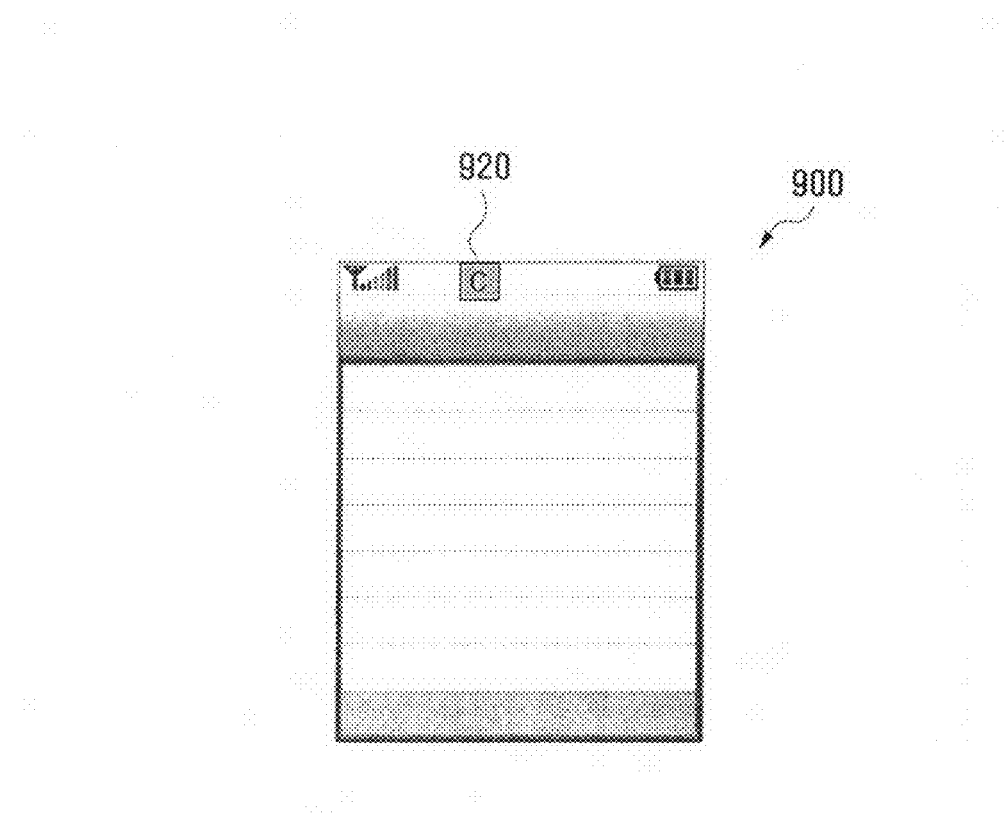

FIGS. 17A and 17B show examples of the above described exemplary embodiment of the present invention. FIG. 17A shows a pattern recognition icon 910 indicative of a state where a pattern recognizable application 900 is executing. The pattern recognition icon 910 may be displayed as other styles, according to whether a pattern recognition executing key is inputted in S210 subsequent thereto. For example, the icon 910 of FIG. 17A is indicative of a state before the pattern recognition executing key is inputted and the icon 920 of FIG. 17B is indicative of a state that the pattern recognition executing key was inputted. These two icons 910 and 920 can be implemented in such a way that they can be differentiated from each other by brightness, color, etc.

Meanwhile, when the executed application cannot perform pattern recognition, the display screen displays an icon (not shown) indicating that it cannot perform pattern recognition or does not display either of the icons 910 or 920.

The above described embodiment of the present invention can be implemented without step S210 where a pattern recognition executing key is inputted. In this case, determining and displaying a state of whether the executing application can perform pattern recognition through steps S204, S206, and S208 are performed before S220 of FIG. 3 where images are captured.

Figure 16:
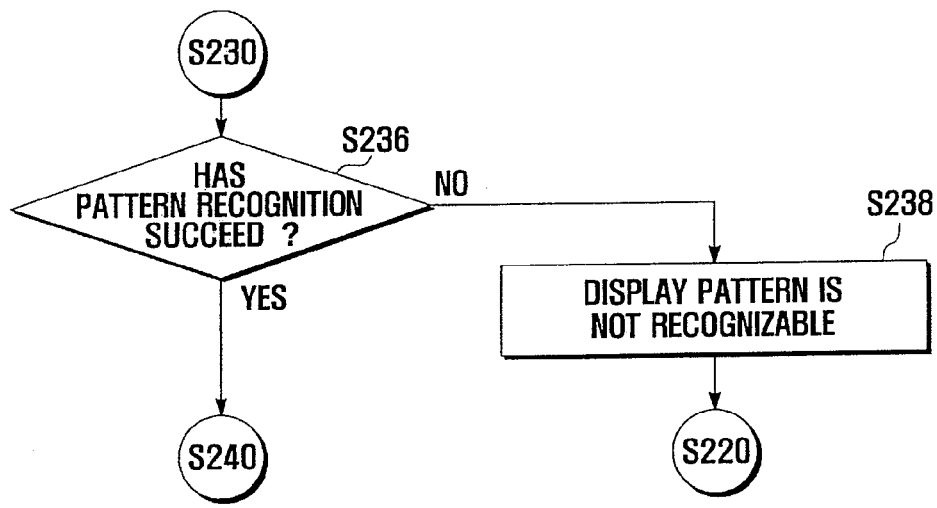
FIG. 16 is a flow chart illustrating a user interface control method according to an exemplary embodiment of the present invention.

FIG. 16 is a flow chart illustrating a user interface control method according to an exemplary embodiment of the present invention.

As will be described with reference to FIG. 16, an exemplary embodiment includes a case where pattern recognition fails in images of a camera. For example, if an image of captured subjects, such as a white wall, does not show distinct features therein, it is difficult to extract a pattern. Therefore, pattern recognition may fail with such an image.

Referring to FIG. 16, pattern recognition regarding the respective images is performed in step S230, as described previously with reference to FIG. 3. In step S236, a determination is made as to whether pattern recognition has succeeded. When pattern recognition has succeeded, pattern analysis is performed in step S240, as described in the embodiment of FIG. On the contrary, when pattern recognition fails, the display screen displays the fail state on the display in step S238.

Figure 17C:
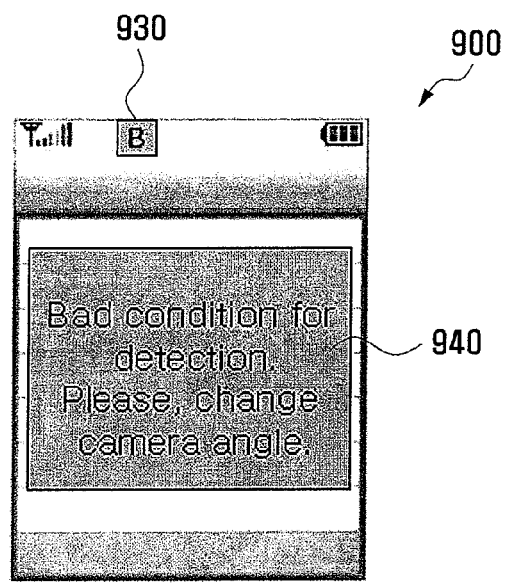

FIG. 17C illustrates a screen when pattern recognition fails. As illustrated, the display screen is indicative of a pattern not recognizable using an icon 930 and/or a phrase 940.

As described above, exemplary embodiments of a portable terminal are implemented to move focus on the display screen in the same direction as the portable terminal is moved and to reduce/magnify a displayed image when the portable terminal is moved away from and drawn closer to a user. That is, when the analysis result determines that the portable terminal is moved, the controller selects a control command related to a movement direction, which is the same direction that the portable terminal is moving. When the analysis result determines that the portable terminal is moved away from and drawn closer to the user, the controller selects control commands related to reduction and magnification of a displayed image, respectively, when the portable terminal is moved away from and drawn closer to the user.

Meanwhile, exemplary embodiments of a portable terminal according to the present invention may be modified in such a way that the focus on the display screen can be moved opposite to the movement direction of the portable terminal and a display image can be magnified/reduced when the portable terminal is moved away from and drawn closer to a user. That is, when the analysis result determines that the portable terminal is moved, the controller selects a control command related to a movement direction, which is opposite from the movement direction of the portable terminal. When the analysis result determines that the portable terminal is moved away from and drawn closer to the user, the controller selects control commands related to magnification and reduction of a displayed image, respectively, when the portable terminal is moved away from and drawn closer to the user.

The above two selections can be defined as a general mode and an opposite mode, respectively. The control method of the present invention may be implemented to further include selecting one of the two modes.

In addition, the portable terminal according to the present invention includes portable phones, PDAs, MP3 players, PMPs, DMB receivers, etc. However, the present invention is not limited by the listed exemplary devices, and may be applied to all types of portable terminals that employ buttons but do not use keyboards and mousses as general input devices.

The present invention can control user interfaces using a camera installed to a portable terminal. Specifically, the present invention extends application of the camera of the portable terminal as well as capture of still images or moving images. Since the present invention uses an image as it is, which is captured by the camera, it does not require additional parts, such as a motion recognition sensor, etc. Therefore, the present invention can reduce size of portable terminals, simplify manufacturing process, and decrease prices, etc.

Also, the present invention can resolve the problems caused when the conventional navigation key is operated. That is, the focus displayed on the screen can be freely operated without restriction of movement direction, as well as up/down/right/left direction, as it is operated by a mouse.

As well, the portable terminal can be intuitively and simply used as its movement or moving away from/drawing closer to a user is directly applied to user interface control.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A user interface control method of a portable terminal including a camera module, the method comprising:

capturing first and second images through a camera module;

recognizing, by a pattern recognition unit, patterns of the first and second images by calculating positions of target points extracted from the first and second images respectively;

analyzing, by a pattern analysis unit, the recognized patterns by calculating a displacement angle $\theta$ based on the positions of the target points;

selecting, by the pattern analysis unit, a control command based on the analysis result; and performing by a controller, a function corresponding to the control command.

2. The method of claim 1, wherein the capturing of the first and second images comprises inputting a pattern recognition executing key.

3. The method of claim 1, wherein the calculating of the displacement angle $\theta$ comprises determining $\theta$ by $$\theta = \tan^{-1}(b/a),$$

wherein the position of the target point in the first image is (x, y) and the position of the compared target point in the second image is (x+a, y+b).

4. The method of claim 3, wherein the analyzing of the recognized patterns further comprises determining a type of an application currently executed.

5. The method of claim 4, wherein the application comprises at least one of a menu list, a file list, an image file, a message write/check window, a document file, a music file, and a game.

6. The method of claim 1, wherein the selecting of the control command comprises selecting at least one of a control command related to movement of four directions according to the displacement angle θ and a control command related to movement of free direction.

7. The method of claim 1, wherein the control command comprises at least one of display previous list, move focus to down menu, display next list, and move focus to up menu, which respectively correspond to conditions of $-45°<θ<45°$, $45°<θ<135°$, $135°<θ<225°$, and $225°<θ<315°$.

8. The method of claim 1, wherein the control command comprises at least one of move focus to previous file, move focus to down file, move focus to next file, and move focus to up file, which respectively correspond to conditions of $-45°<θ<45°$, $45°<θ<135°$, $135°<θ<225°$, and $225°<θ<315°$.

9. The method of claim 1, wherein the control command corresponds to the displacement angles to move a focus.

10. The method of claim 1, further comprising:
determining whether a currently executed application can perform pattern recognition; and
displaying a state of whether the currently executed application can perform pattern recognition.

11. The method of claim 10, wherein the displaying of the state comprises displaying a pattern recognition icon when the currently executed application can perform pattern recognition.

12. The method of claim 1, further comprising:
determining whether the pattern recognition has succeeded; and
displaying that the pattern is not recognizable when the pattern recognition has not succeeded.

13. The method of claim 12, wherein the displaying that the pattern is not recognizable comprises displaying at least one of an icon and a phrase.

14. A user interface control method of a portable terminal including a camera module, the method comprising:
capturing first and second images through a camera module;
recognizing, by a pattern recognition unit, patterns of the first and second images by calculating positions of target points extracted from the first and second images respectively;
analyzing, by a pattern analysis unit, the recognized patterns by calculating a distance increment/decrement Δd from the positions of the target points and determining whether the distance increment/decrement Δd comprises a positive or negative value;
selecting, by the pattern analysis unit, a control command based on the analysis result; and
performing, by a controller, a function corresponding to the control command.

15. The method of claim 14, wherein the calculating of the distance increment/decrement Δd comprises determining Δd by $$d=\sqrt{(x-u)^2+(y-v)^2}, d'=\sqrt{(x'-u')^2+(y'-v')^2}, \text{ and } \Delta d=d-d'$$

wherein the positions of the target points in the first image are (x, y) and (u, v), and the positions of the compared target points in the second image are (x', y') and (u', v') wherein (x', y') are (x+a, y+b) and (u', v') are (u+c, v+d).

16. The method of claim 14, wherein the selecting of the control command comprises selecting a screen magnification when the distance increment/decrement is positive and selecting a screen reduction when the distance increment/decrement is negative.

17. A user interface control method of a portable terminal including a camera module, the method comprising:
capturing first and second images through a camera module;
recognizing, by a pattern recognition unit, patterns of the first and second images by calculating positions of target points extracted from the first and second images respectively;
analyzing, by a pattern analysis unit, the recognized patterns by calculating an average displacement m and a distance change from the positions of the target points and comparing the average displacement m with the distance change;
selecting, by the pattern analysis unit, a control command based on the analysis result; and
performing, by a controller, a function corresponding to the control command.

18. The method of claim 17, wherein the calculating of the average displacement m comprises calculating m by $$p = \sqrt{(x-x')^2 + (y-y')^2},$$
$$q = \sqrt{(u-u')^2 + (v-v')^2},$$
and
$$m = \frac{p+q}{2}$$

wherein the distance change is an absolute value of a distance increment/decrement Δd that is calculated by $$d=\sqrt{(x-u)^2+(y-v)^2}, d'=\sqrt{(x'-u')^2+(y'-v')^2}, \text{ and } \Delta d=d-d',$$

wherein the positions of the compared target points in the first image are (x, y) and (u, v), and the positions of the target points in the second image are (x+a, y+b) and (u+c, v+d), p is a distance between target points (x, y) in the first image and (x+a, y+b) in the second image wherein x'=x+a, and y'=y+b, and q is a distance between target points (u,v) in the first image and (u+c, v+d) in the second image wherein u'=u+c and v'=v+d.

19. The method of claim 17, wherein the selecting of the control command comprises selecting a direction movement when the average displacement is greater than the distance change and selecting a screen magnification/reduction when the distance change is greater than the average displacement.

20. A user interface control method of a portable terminal including a camera module, the method comprising:
capturing first and second images corresponding to motion of a portable terminal through a camera module;
recognizing, by a pattern recognition unit, patterns of the first and second images by calculating positions of target points extracted from the first and second images respectively;
analyzing, by a pattern analysis unit, the motion of the portable terminal based on the recognized patterns by calculating a displacement angle θ based on the positions of the target points;
selecting, by the pattern analysis unit, a control command corresponding to the analyzed motion of the portable terminal; and
performing, by a controller, a function corresponding to the control command.

21. The method of claim 20, wherein the selecting of the control command comprises selecting a direction movement corresponding to the direction that the portable terminal is moved in, when the analysis determines that the motion of the portable terminal is movement.

22. The method of claim 20, wherein the selecting the control command comprises selecting a direction movement that is opposite to the movement direction of the portable terminal, when the analysis determines that the motion of the portable terminal is movement.

23. The method of claim 20, wherein the selecting of the control command comprises selecting a reduction/magnification of a display image, corresponding to pushing/pulling of the portable terminal, respectively, when the analysis determines that the motion of the portable terminal is moving away from/drawing closer to a user.

24. The method of claim 20, wherein the selecting of the control command comprises selecting a magnification/reduction of a display image, corresponding to pushing/pulling of the portable terminal, respectively, when the analysis determines that the motion of the portable terminal is moving away from/drawing closer to a user.

25. A portable terminal comprising:
a camera module for capturing first and second images;
a pattern recognition unit for recognizing patterns of the first and second images by calculating positions of target points extracted from the first and second images respectively;
a pattern analysis unit for analyzing the recognized patterns, based on the pattern recognition result of the pattern recognition unit by calculating a displacement angle $\theta$ based on the positions of the target points, and for selecting a control command based on the analysis result; and
a controller for performing a function corresponding to the control command.

* * * * *